US007636546B2

(12) United States Patent
Karabinis (10) Patent No.: US 7,636,546 B2
(45) Date of Patent: Dec. 22, 2009

(54) SATELLITE COMMUNICATIONS SYSTEMS AND METHODS USING DIVERSE POLARIZATIONS

(75) Inventor: Peter D. Karabinis, Cary, NC (US)

(73) Assignee: ATC Technologies, LLC, Reston, VA (US)

(*) Notice: Subject to any disclaimer, the term of this patent is extended or adjusted under 35 U.S.C. 154(b) by 770 days.

(21) Appl. No.: 11/313,039

(22) Filed: Dec. 20, 2005

(65) Prior Publication Data

US 2006/0189274 A1 Aug. 24, 2006

Related U.S. Application Data

(60) Provisional application No. 60/655,150, filed on Feb. 22, 2005.

(51) Int. Cl.
H04B 7/185 (2006.01)

(52) U.S. Cl. .................. 455/12.1; 455/427; 455/13.2; 455/443; 370/316

(58) Field of Classification Search ............... 455/12.1, 455/13.2, 13.3, 427–429, 444, 449, 446, 455/443, 20, 101; 370/335, 316, 323, 322, 370/324
See application file for complete search history.

(56) References Cited

U.S. PATENT DOCUMENTS

| | | | |
|---|---|---|---|
| 4,689,625 A | 8/1987 | Barmat | |
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |

(Continued)

FOREIGN PATENT DOCUMENTS

| | | | |
|---|---|---|---|
| EP | 0 506 255 A2 | 9/1992 | |
| EP | 0 597 225 A1 | 5/1994 | |
| EP | 0 506 255 B1 | 11/1996 | |
| EP | 0 748 065 A2 | 12/1996 | |
| EP | 0 755 163 A2 | 1/1997 | |

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Sujatha Sharma
(74) *Attorney, Agent, or Firm*—Myers Bigel Sibley & Sajovec, P.A.

(57) ABSTRACT

Communications occur between a satellite and respective first and second classes of terminals using substantially different polarizations. The first class of terminals may include fixed and/or vehicle-based terminals, and the second class of terminals may include handheld terminals. The second class of terminals may include terminals configured to preferentially receive and/or transmit linearly polarized signals, for example, terminals with substantially linearly polarized antennas, and the first class of terminals may include terminals configured to preferentially receive and/or transmit circularly polarized signals, for example, terminals with patch and/or helical antennas configured to transmit and/or receive substantially circularly polarized signals.

24 Claims, 6 Drawing Sheets

U.S. PATENT DOCUMENTS

| | | | |
|---|---|---|---|
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,173,178 B1 * | 1/2001 | Hammill et al. | 455/429 |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,327,063 B1 * | 12/2001 | Rockwell | 398/122 |
| 6,339,611 B1 | 1/2002 | Antonio et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,522,865 B1 | 2/2003 | Otten | |
| 6,597,750 B1 | 7/2003 | Knutson et al. | |
| 6,628,919 B1 | 9/2003 | Curello et al. | |
| 6,684,057 B2 | 1/2004 | Karabinis | |
| 6,704,543 B1 * | 3/2004 | Sharon et al. | 455/12.1 |
| 6,735,437 B2 | 5/2004 | Mayfield et al. | |
| 6,775,251 B1 | 8/2004 | Wiedeman | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,170,874 B2 * | 1/2007 | Fischer | 370/334 |
| 2001/0004605 A1 * | 6/2001 | Miyano et al. | 455/562 |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054761 A1 | 3/2003 | Karabinis | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153308 A1 | 8/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis et al. | |
| 2005/0288011 A1 | 12/2005 | Dutta | |
| 2006/0002347 A1 * | 1/2006 | Thompson et al. | 370/335 |
| 2006/0040659 A1 | 2/2006 | Karabinis | |

FOREIGN PATENT DOCUMENTS

| | | | |
|---|---|---|---|
| EP | 0 762 669 A2 | 3/1997 | |
| EP | 0 762 669 A3 | 3/1997 | |
| EP | 0 797 319 A2 | 9/1997 | |
| EP | 0 831 599 A2 | 3/1998 | |
| EP | 0 831 599 A3 | 3/1998 | |
| EP | 1 050 980 A1 | 11/2000 | |
| EP | 1 059 826 A1 | 12/2000 | |
| EP | 1 156 599 A2 | 11/2001 | |
| EP | 1 193 989 A1 | 4/2002 | |
| WO | WO 97/14192 | 4/1997 | |
| WO | WO 01/54314 A1 | 7/2001 | |
| WO | WO 2005/071862 A2 | 8/2005 | |
| WO | WO 2005/093967 A1 | 10/2005 | |

OTHER PUBLICATIONS

Ayyagari et al., "A satellite-augmented cellular network concept", *Wireless Networks*, Vo. 4, 1998, pp. 189-198.

International Search Report and Written Opinion; Date of Mailing Jul. 13, 2006.

* cited by examiner

SATELLITE COMMUNICATIONS SYSTEMS AND METHODS USING DIVERSE POLARIZATIONS

RELATED APPLICATION

The present application claims the benefit of U.S. Provisional Application Ser. No. 60/655,150, filed Feb. 22, 2005, the disclosure of which is hereby incorporated by reference herein in its entirety.

FIELD OF THE INVENTION

This invention relates to wireless communications systems and methods and, more particularly, to satellite communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna beam (antenna pattern) to provide forward- or return-link communications over an entire area served by the system. Alternatively or in combination with the above, in cellular satellite radiotelephone communications systems and methods, multiple satellite beams (satellite cells or antenna patterns) are provided, each of which can serve one or more substantially distinct geographic areas in an overall service region, to collectively serve an overall satellite footprint. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink, forward link or forward service link, and from the radiotelephone to the satellite over an uplink, return link or return service link.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal", a "mobile terminal" or simply as a "terminal". As used herein, the term(s) "radioterminal," "radiotelephone," "mobile terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term space-based component includes one or more satellites and/or one or more other objects/platforms (such as airplanes, balloons, unmanned vehicles, space crafts, missiles, etc.) that have a regular and/or irregular trajectory above the earth at any altitude.

Terrestrial networks can enhance an availability, efficiency and/or economic viability of a cellular satellite radiotelephone system by terrestrially using/reusing at least some of the frequencies authorized for use by the cellular satellite radiotelephone system. In particular, it is known that it may be difficult for a cellular satellite radiotelephone system to reliably serve densely populated areas, because a satellite signal may be blocked by high-rise structures and/or may not effectively penetrate into buildings and/or other structures. As a result, a satellite spectrum may be underutilized or unutilized in such areas. The terrestrial use/reuse of at least some of the satellite system frequencies can reduce or eliminate this potential problem.

Moreover, a capacity of an overall system (comprising a space-based network and a terrestrial network) may be increased by the introduction of terrestrial frequency use/reuse of at least some of the frequencies authorized for use by the space-based network, since terrestrial frequency reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to the present inventor Karabinis entitled Satellite Telecommunications Repeaters and Retransmission Methods, the disclosure of which is hereby incorporated herein by reference in its entirety as if set forth fully herein. As described therein, a satellite telecommunications repeater is provided which receives, amplifies, and locally retransmits downlink/uplink signal(s) received at the satellite telecommunications repeater from a satellite/radioterminal thereby increasing an effective downlink/uplink signal strength (margin) in the vicinity of the satellite telecommunications repeater and allowing an increase in the penetration of downlink/uplink signals into and/or out of buildings, foliage, transportation vehicles, and/or other objects which can reduce signal strength (margin). Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some of the satellite radiotelephone system frequencies and using substantially the same air interface for both terrestrial and satellite communications may be more cost effective and/or aesthetically appealing than other alternatives. Conventional dual-band/dual-mode radiotelephone alternatives, such as the well known Thuraya, Iridium and/or Globalstar dual-band/dual-mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to the present inventor Karabinis, entitled Satellite System Utilizing a Plurality of Air Interface Standards and Method Employing Same.

Satellite radiotelephone communications systems and methods that may employ terrestrial use/reuse of frequencies authorized for use by a space-based component are described in U.S. Pat. No. 6,684,057 to Karabinis, entitled Systems and Methods for Terrestrial Reuse of Cellular Satellite Frequency Spectrum; US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; U.S. Pat. No. 6,856,787 to Karabinis, entitled Wireless Communications Systems and Methods Using Satellite-Linked Remote Terminal Interface Subsystems; U.S. Pat. No. 6,937,857 to Karabinis, entitled Systems and Methods for Reducing Satellite Feeder Link Bandwidth/Carriers In Cellular Satellite Systems; U.S. Pat. No. 6,892,068 to Karabinis et al., entitled Coordinated Satellite-Terrestrial Frequency Reuse; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; U.S. Pat. No. 6,785,543 to Karabinis, entitled Filters for Combined Radiotelephone/GPS Terminals; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, all of which are assigned to the assignee of the present invention, the disclosures of all of which are hereby incorporated herein by reference in their entirety as if set forth fully herein.

Some satellite radiotelephone systems and methods may employ interference cancellation techniques to allow an increase in terrestrial reuse of satellite frequencies. For example, as described in U.S. Pat. No. 6,684,057 to Karabinis, cited above, a satellite radiotelephone frequency can be reused terrestrially by an ancillary terrestrial network even within the same satellite cell, using interference cancellation techniques. Moreover, the ancillary terrestrial network can use a modified range of satellite band forward link frequencies for transmission, to reduce interference with out-of-band receivers. A modified range of satellite band forward link frequencies that is used by the ancillary terrestrial network can include only a subset of the standard satellite band forward link frequencies to provide a guard band, can include power levels that monotonically decrease as a function of increasing frequency and/or can include two or more contiguous slots per frame that are left unoccupied and/or are transmitted at reduced maximum power. Time division duplex operation of the ancillary terrestrial network may also be provided over at least a portion of satellite band return frequencies. Full or partial reverse mode operation of the ancillary terrestrial network also may be provided, where at least some of the forward link and return link frequencies are interchanged with the conventional satellite forward link and return link frequencies. See the Abstract of U.S. Pat. No. 6,684,057.

Other radiotelephone systems and methods can monitor terrestrial reuse of satellite-band frequencies to reduce potential interference. For example, as described in Published U.S. Patent Application No. US 2003/0054814 A1, cited above, radiation by an ancillary terrestrial network, and/or satellite radiotelephones that communicate therewith are monitored and controlled, to reduce and preferably prevent intra-system interference and/or interference with other satellite radiotelephone systems. In particular, a satellite radiotelephone system includes a space-based component that is configured to wirelessly communicate with first radiotelephones in a satellite footprint over a satellite radiotelephone frequency band, and an ancillary terrestrial network that is configured to wirelessly communicate with second radiotelephones in the satellite footprint over at least some of the satellite radiotelephone frequency band, to thereby terrestrially reuse the at least some of the satellite radiotelephone frequency band. Wireless radiation by the ancillary terrestrial network and/or the second radiotelephones at the space-based component is monitored, and the radiation by the ancillary terrestrial network and/or the plurality of second radiotelephones is adjusted in response to the monitoring. Intra-system interference and/or interference with other satellite systems thereby may be reduced or prevented. See the Abstract of U.S. Published Patent Application US 2003/0054814 A1.

Finally, additional systems and methods may be used to monitor terrestrially reused satellite frequencies to reduce potential interference. For example, as described in Published U.S. Patent Application No. US 2003/0073436 A1, cited above, a satellite radiotelephone system includes a space-based component, an ancillary terrestrial network, a monitor and a controller. The space-based component is configured to wirelessly communicate with radiotelephones in a satellite footprint over a satellite radiotelephone frequency band. The satellite footprint is divided into satellite cells in which subsets of the satellite radiotelephone frequency band are spatially reused in a spatial reuse pattern. The ancillary terrestrial network is configured to wirelessly communicate with radiotelephones in the satellite footprint over at least some of the satellite radiotelephone frequency band, to thereby terrestrially reuse the at least some of the satellite radiotelephone frequency band. The monitor is configured to monitor wireless radiation at the space-based component that is produced by the ancillary terrestrial network and/or the radiotelephones in satellite cells that adjoin a satellite cell and/or in the satellite cell, in at least part of the subset of the satellite radiotelephone frequency band that is assigned to the satellite cell for space-based component communications. The controller is configured to adjust the radiation by the ancillary terrestrial network and/or the radiotelephones, in response to the monitor. See the Abstract of U.S. Published Patent Application U.S. 2003/0073436 A1.

SUMMARY OF THE INVENTION

Some embodiments of the present invention provide satellite communications methods wherein communications occur between a satellite and respective first and second classes of terminals using substantially different polarizations. For example, signals may be transmitted from the satellite to the first class of terminals and/or from the first class of terminals to the satellite with substantially a first polarization, and signals may be transmitted from the satellite to the second class of terminals and/or from the second class of terminals to the satellite with substantially a second polarization. In further embodiments, communicating between a satellite and respective different first and second classes of terminals may include discriminating between signals having substantially a first polarization and signals having substantially a second polarization to discriminate between transmissions associated with the first class of terminals and transmissions associated with the second class of terminals.

In some embodiments of the present invention, the first class of terminals includes fixed and/or vehicle-based terminals, while the second class of terminals includes handheld terminals. In further embodiments, the first class of terminals includes terminals configured to preferentially receive and/or transmit linearly polarized signals, for example, terminals with linearly polarized antennas, and the second class of terminals includes terminals configured to preferentially receive and/or transmit circularly polarized signals, for example, terminals with patch and/or other antennas configured to transmit and/or receive circularly polarized signals. In additional embodiments, the first class of terminals may include terminals configured to preferentially receive and/or transmit right hand circularly polarized signals, and the second class of terminals may include terminals configured to preferentially receive and/or transmit left hand circularly polarized signals.

According to some embodiments of the present invention, communicating between a satellite and respective first and second classes of terminals using substantially different polarizations includes communicating between the satellite and the first class of terminals using a substantially circular polarization and communicating between the satellite and the second class of terminals using a substantially linear polarization. Communicating between the satellite and the first class of terminals using a substantially circular polarization may further include communicating between the satellite and first and second subclasses of the first class of terminals using respective substantially different first and second substantially circular polarizations.

In further embodiments, communicating between a satellite and respective first and second classes of terminals using substantially different polarizations may include discriminating between signals having substantially a right hand circular polarization and signals having substantially a left hand circular polarization to discriminate between transmissions from the first class of terminals and transmissions from the second class of terminals. Signals may be transmitted from the satellite to the first and second classes of terminals using a substantially right hand circular polarization and/or a substantially left hand circular polarization. In additional embodiments, communicating between a satellite and respective first and second classes of terminals using substantially different polarizations may include discriminating between signals having substantially a right hand circular polarization and signals having substantially a left hand circular polarization to discriminate between transmissions from the first class of terminals and transmissions from the second class of terminals. Transmissions from the satellite to both of the first and second classes of terminals may use a substantially right-hand circular polarization or a substantially left-hand circular polarization. In still further embodiments, communicating between a satellite and respective first and second classes of terminals using substantially different polarizations may include communicating between the satellite and the first class of terminals using a substantially linear polarization and communicating between the satellite and the second class of terminals using a substantially circular polarization.

According to some embodiments of the present invention, a satellite communications system includes a satellite configured to communicate with respective first and second classes of terminals using substantially different polarizations. The satellite may be configured to transmit signals having substantially a first polarization to the first class of terminals and to transmit signals having substantially a second polarization to the second class of terminals. The satellite may be configured to discriminate between signals having substantially a first polarization and signals having substantially a second polarization to discriminate between transmissions from the first class of terminals and transmissions from the second class of terminals.

In some embodiments, the satellite is configured to communicate with the first class of terminals using a substantially circular polarization and to communicate with the second class of terminals using a substantially linear polarization. In additional embodiments, the satellite is configured to communicate with first and second subclasses of the first class of terminals using respective substantially different first and second substantially circular polarizations. In further embodiments, the satellite is configured to discriminate between signals having substantially a right hand circular polarization and signals having substantially a left hand circular polarization to discriminate between transmissions from the first class of terminals and transmissions from the second class of terminals, and to transmit to the first and second classes of terminals using a substantially right hand circular polarization and/or a substantially left hand circular polarization.

In some embodiments, the satellite is configured to discriminate between signals having substantially a right hand circular polarization and signals having substantially a left hand circular polarization to discriminate between transmissions from the first class of terminals and transmissions from the second class of terminals and to transmit to both of the first and second classes of terminals using a substantially right hand circular polarization or a substantially left hand circular polarization. In yet further embodiments, the satellite is configured to communicate with the first class of terminals using a substantially linear polarization and to communicate with the second class of terminals using a substantially circular polarization.

Additional embodiments of the present invention provide wireless terminals configured to communicate with a satellite using substantially different polarizations in respective first and second modes of operation. The terminal may be configured to transmit signals having substantially a first polarization in the first mode and to transmit signals having substantially a second polarization in the second mode. The terminal may be configured to preferentially receive signals having substantially a first polarization in a first mode and to preferentially receive signals having substantially a second polarization in the second mode. The terminal may be configured to discriminate between signals having substantially a first polarization and signals having substantially a second polarization to discriminate between transmissions intended for the terminal and transmissions intended for another terminal.

DETAILED DESCRIPTION

Specific exemplary embodiments of the invention now will be described with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, like designations refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first space-based component below could be termed a second space-based component, and similarly, a second space-based component may be termed a first space-based component without departing from the teachings of the present invention. As used herein, the term "and/or" includes any and all combinations of one or more of the associated listed items. The symbol "/" is also used as a shorthand notation for "and/or".

Moreover, as used herein, "substantially the same" band(s) means that two or more bands being compared substantially overlap, but that there may be some areas of non-overlap, for example at a band end and/or elsewhere. "Substantially the same" air interface(s) means that two or more air interfaces being compared are similar (one may be based on the other) but need not be identical. Some differences may exist in one air interface (i.e., a satellite air interface) relative to another (i.e., a terrestrial air interface) to account for different characteristics that may exist between the terrestrial and satellite communications environments. For example, a different vocoder rate may be used for satellite communications compared to the vocoder rate that may be used for terrestrial communications (i.e., for terrestrial communications, voice may be compressed ("vocoded") to approximately 9 to 13 kbps, whereas for satellite communications a vocoder rate of approximately 2 to 4 kbps, for example, may be used); a different forward error correction code, different interleaving depth, and/or different spread-spectrum codes may also be used, for example, for satellite communications compared to an error correction code, interleaving depth, and/or spread spectrum codes (i.e., Walsh codes, short codes, long codes, and/or frequency hopping codes) that may be used for terrestrial communications.

Some embodiments of the present invention can use different service link polarizations to increase a service link capacity of a satellite communications system. In particular, some classes of radioterminals may use substantially linear polarization on their forward and/or return service links with the satellite, whereas other classes of radioterminals may use substantially right hand circular polarization or substantially left hand circular polarization on their forward and/or return service links. In still other embodiments, a multi-mode radioterminal can operate using substantially linear polarization, substantially right hand circular polarization and/or substantially left hand circular polarization in its forward and/or return service links with the satellite. Analogous system, method, satellite and radioterminal embodiments may be provided.

In various embodiments of the present invention, substantially different polarizations are used for communicating with respective first and second classes of terminals. As described herein, "substantially different polarizations" include polarizations that are sufficiently different to allow a receiving entity, e.g., a satellite or terminal, to discriminate between signals having the different polarizations. For example, in some embodiments, a first class of terminals may transmit to a satellite using a first substantially circular polarization, while a second class of terminals may transmit to the satellite using a second substantially circular polarization that is substantially orthogonal to the first, such that the signals may be discriminated by using, for example, antennas at the satellite with different sensitivities to the respective polarizations. As described herein, transmitting with "substantially linear polarization" from a satellite and/or radioterminal includes, but is not limited to, transmitting signals that have a predominantly linear polarization, i.e., have an electric field predominantly aligned with a particular plane (e.g., horizontal or vertical). Similarly, transmitting with "substantially right hand circular polarization" includes, but is not limited to, transmitting signals that have a predominantly right hand circular polarization, and transmitting with "substantially left hand circular polarization" includes, but is not limited to, transmitting signals that have a predominantly left hand circular polarization.

Receiving "substantially linearly polarized" signals refers to the ability of a receiving component (e.g., a satellite and/or radioterminal) to discriminate signals that are linearly polarized from signals having other polarizations or, in other words, preferentially receiving signals having such polarization. Similarly, receiving "substantially right hand circularly polarized" signals and receiving "substantially left hand circularly polarized" signals refer to discriminating signals with such polarizations from signals having other polarizations.

Figure 1:
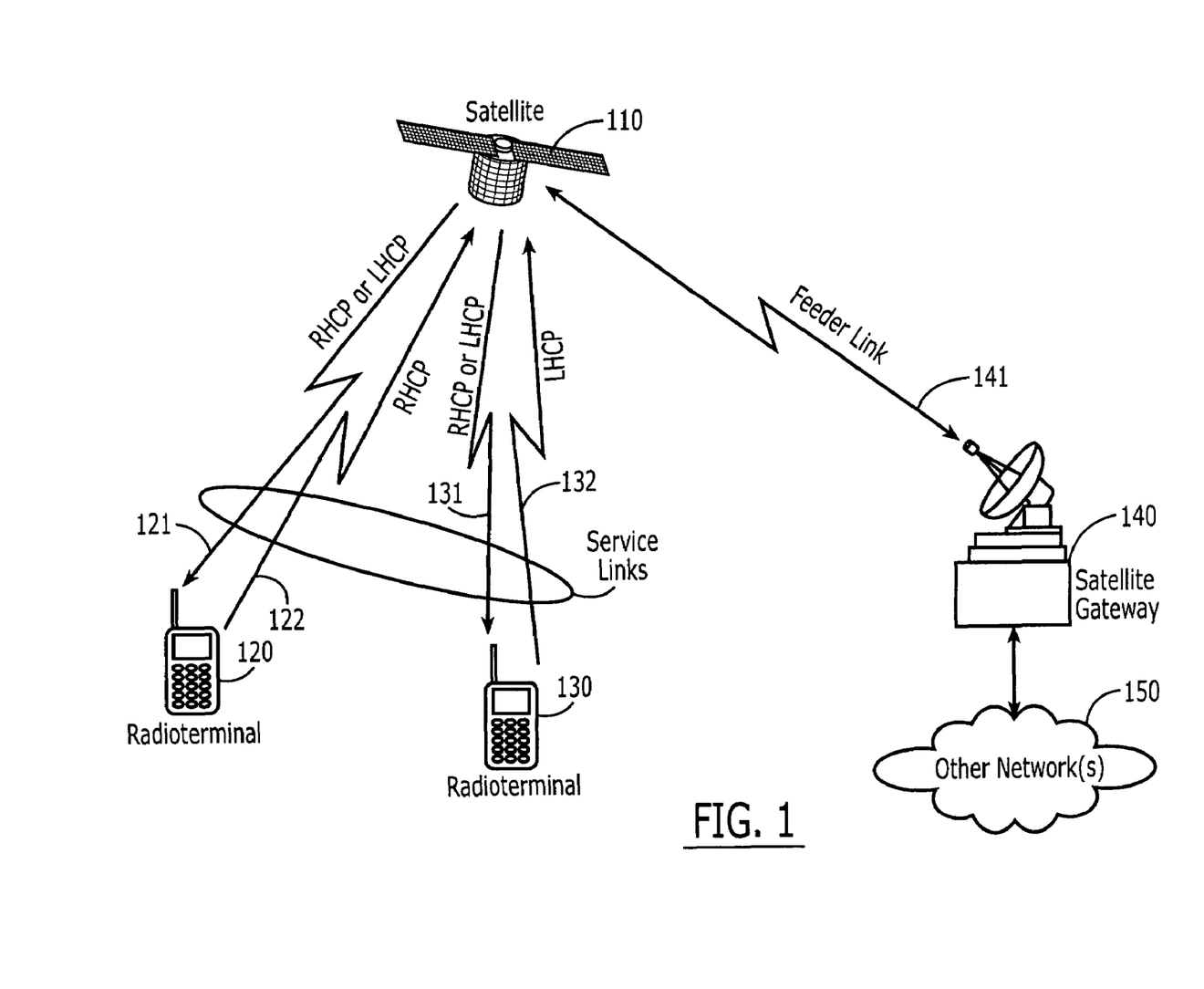
FIGS. 1-6 illustrate satellite communications systems and methods using polarization discrimination according to various embodiments of the present invention.

It will be appreciated that signals having particular polarizations may include components with other polarizations. For example, "substantially (right or left hand) circularly polarized signals" may include signals that have less than ideal circular polarization, e.g., elliptical polarization. Generally, the degree of polarization discrimination needed to provide separation may depend on many factors, including, but not limited to, transmit power, characteristics of the propagation medium, selectivity of the receiver, and additional separation provided by other discrimination techniques, such as frequency separation, spatial separation, temporal separation and code separation (e.g., use of spreading codes). As shown in FIG. 1, a satellite 110 according to some embodiments of the present invention is configured to communicate with another network 150 via a satellite gateway 140 and a feeder link 141. The satellite 110 may be further configured to receive substantially Right-Hand Circularly Polarized (RHCP) communications from a first class of radioterminals 120 over uplinks 122 and to receive substantially Left-Hand Circularly Polarized (LHCP) communications from a second class of radioterminals 130 over uplinks 132.

The satellite 110 may also be configured to transmit substantially RHCP or substantially LHCP to the first class of radioterminals 120 and/or the second class of radioterminals 130, or the satellite 110 may be configured to transmit substantially RHCP to the first class of radioterminals 120 and to transmit substantially LHCP to the second class of radioterminals 130. The first and second classes of radioterminals 120, 130 may also be configured correspondingly with the respective satellite transmitter/receiver configuration(s).

Figure 2:
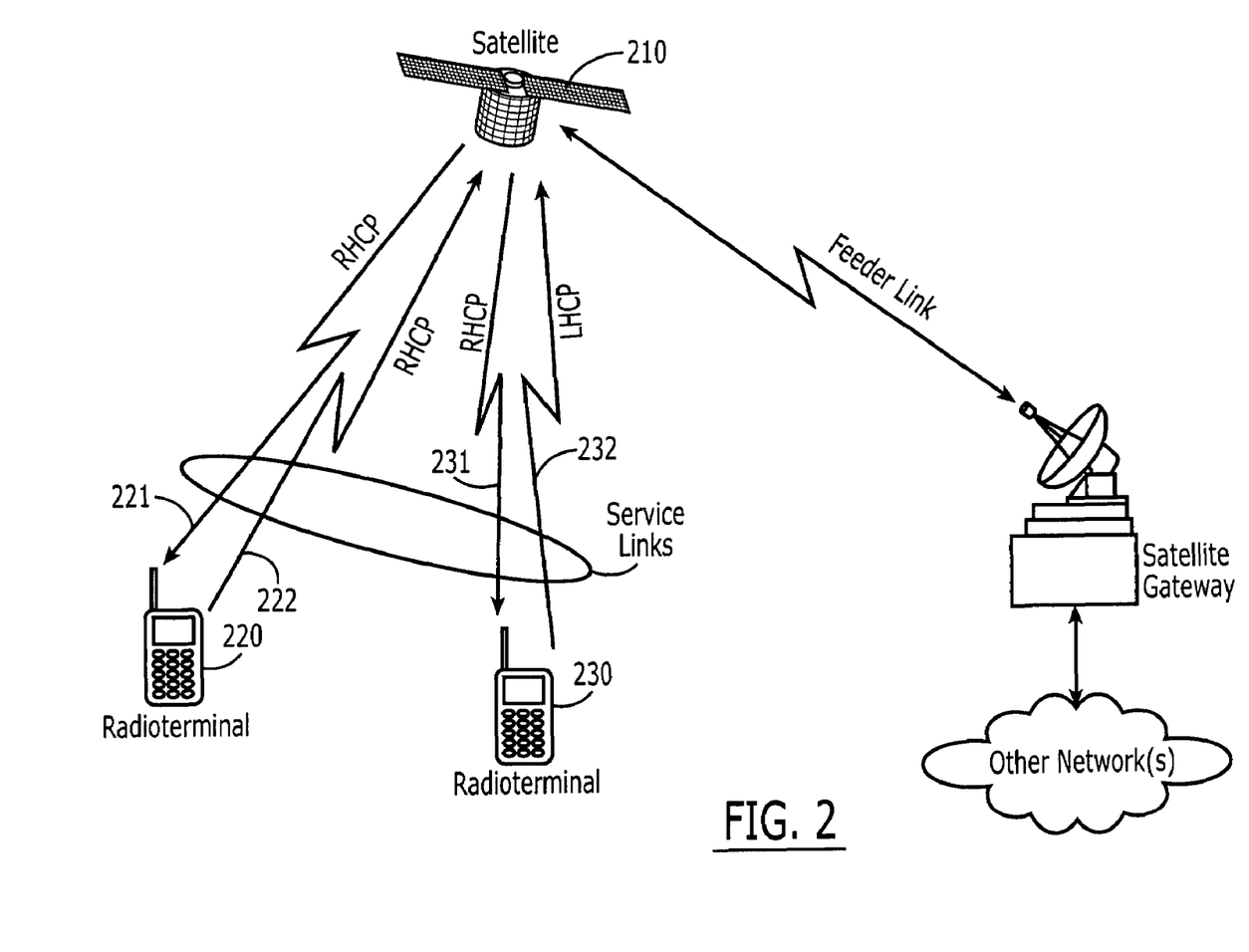
Figure 3:
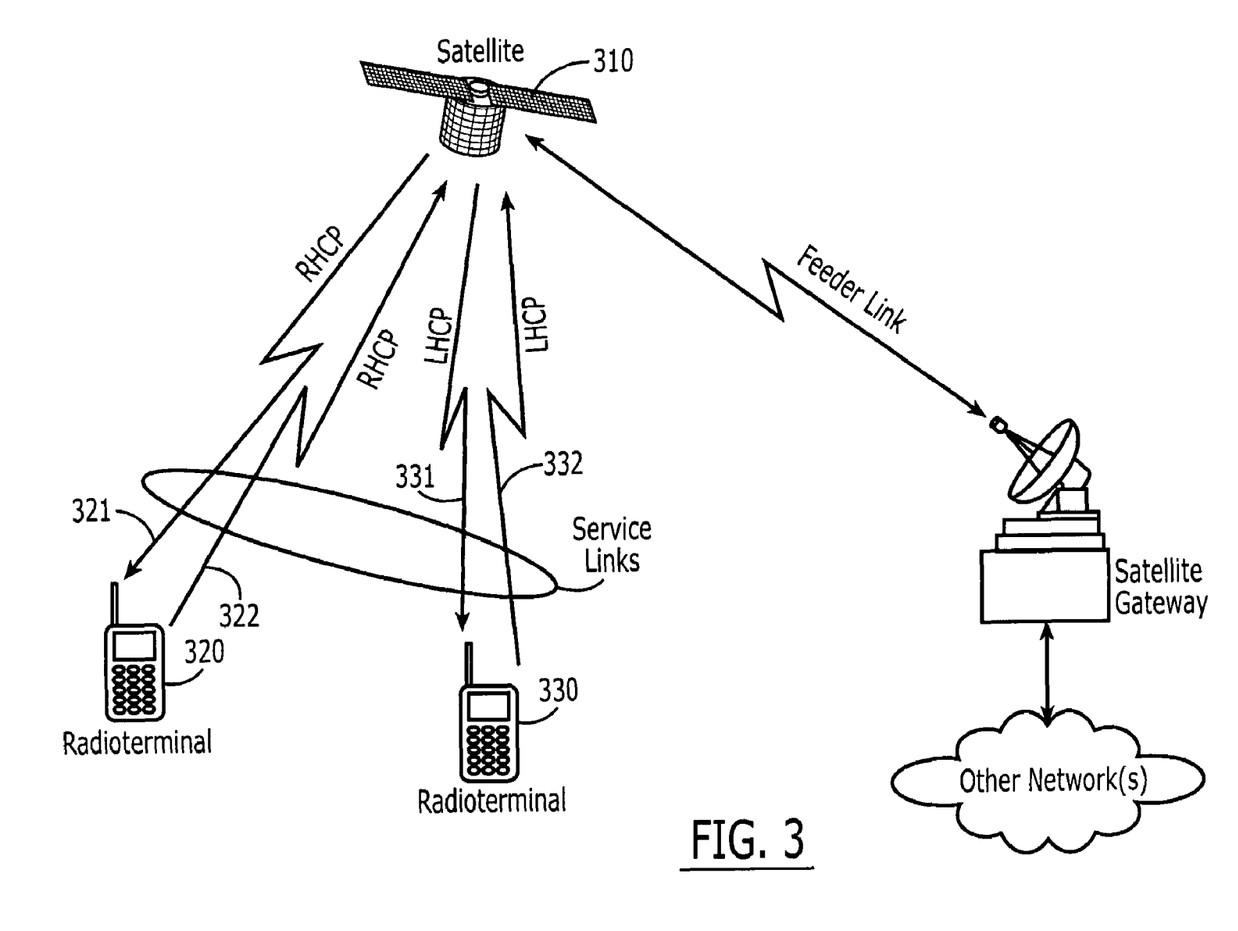

As illustrated in FIG. 2, in some embodiments, a first class of radioterminals 220 transmits signals to a satellite 210 using substantially RHCP on uplinks 222 and receives signals transmitted by the satellite 210 over downlinks 221 using substantially RHCP. A second class of radioterminals 230 transmits signals to the satellite 210 over uplinks 232 using substantially LHCP and receives signals transmitted by the satellite 210 over downlinks 231 using substantially RHCP. In other embodiments, a first class of radioterminals transmits substantially RHCP and receives substantially LHCP and a second class of radioterminals transmits substantially LHCP and receives substantially LHCP. In further embodiments, as shown in FIG. 3, a first class of radioterminals 320 transmits to a satellite 310 over uplinks 322 using substantially RHCP and receives signals transmitted from the satellite 310 over downlinks 321 using substantially RHCP. A second class of radioterminals transmits to the satellite 310 over uplinks 332 using substantially LHCP and receives signals transmitted by the satellite 310 over downlinks 331 using substantially LHCP.

Figure 4:
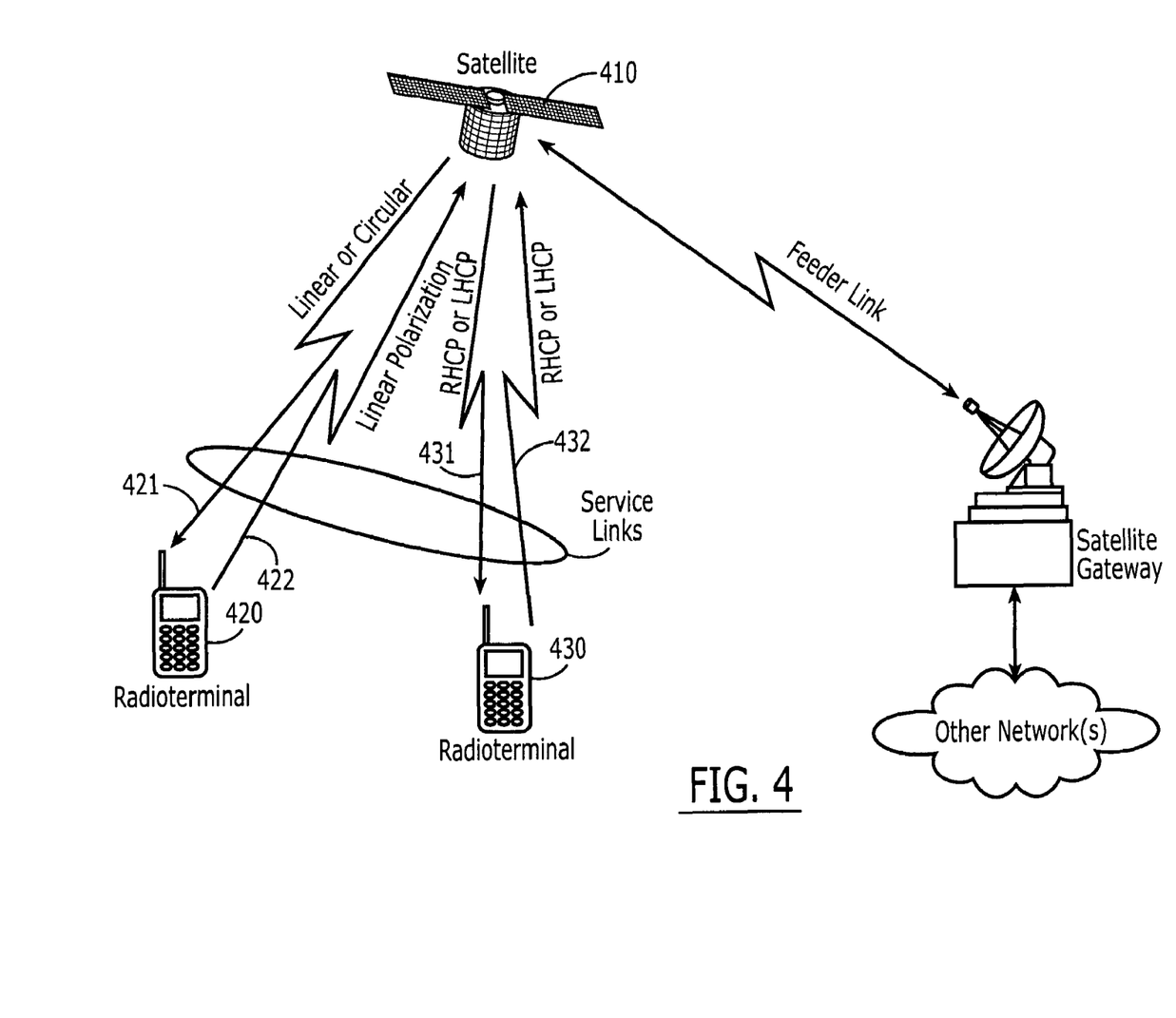

FIG. 4 illustrates other embodiments of the present invention wherein a first class of radioterminals 420 transmits to a satellite 410 over uplinks 422 using substantially linear polarization and receives from the satellite 410 over downlinks 421 using substantially linear or substantially circular polarization, whereas a second class (or second and third classes) of radioterminals 430 uses substantially RHCP and/or substantially LHCP to transmit and/or receive to and from the satellite 410 over uplinks 432 and downlinks 431. In some embodiments, the same or different substantially circular polarizations may be used for transmitting and receiving by a given class of radioterminals.

By using substantially orthogonal circular polarizations according to some embodiments of the present invention, service link capacity may be increased while reducing or minimizing interference. Some embodiments of the invention may arise from a recognition that some radioterminals, such as vehicular terminals or fixed terminals, may employ patch antennas (or other antennas) that can transmit and/or receive using a given substantially circular polarization, whereas other radioterminals such as, for example, handheld mobile terminals may use antennas that transmit and/or receive using substantially linear polarization. Embodiments of the present invention may service these different classes of radioterminals by servicing the handheld mobile terminals using substantially linear polarization and allowing an increased capacity for serving vehicular and/or fixed radioterminals using substantially different circular polarizations. According to some embodiments, multiple classes of vehicular and/or fixed terminals may be provided according to the different polarizations that are used in the forward and/or return service links. Accordingly, in some embodiments, differing substantially circular polarizations can be used to increase the service link capacity with radioterminals that are capable of transmitting and/or receiving substantially circularly polarized radiation (substantially RHCP/substantially LHCP), while allowing handheld terminals to use substantially linear polarization. In still other embodiments, handheld and/or portable/transportable wireless terminals may include antennas that allow substantially RHCP and/or substantially LHCP to be transmitted and/or received.

Figure 5:
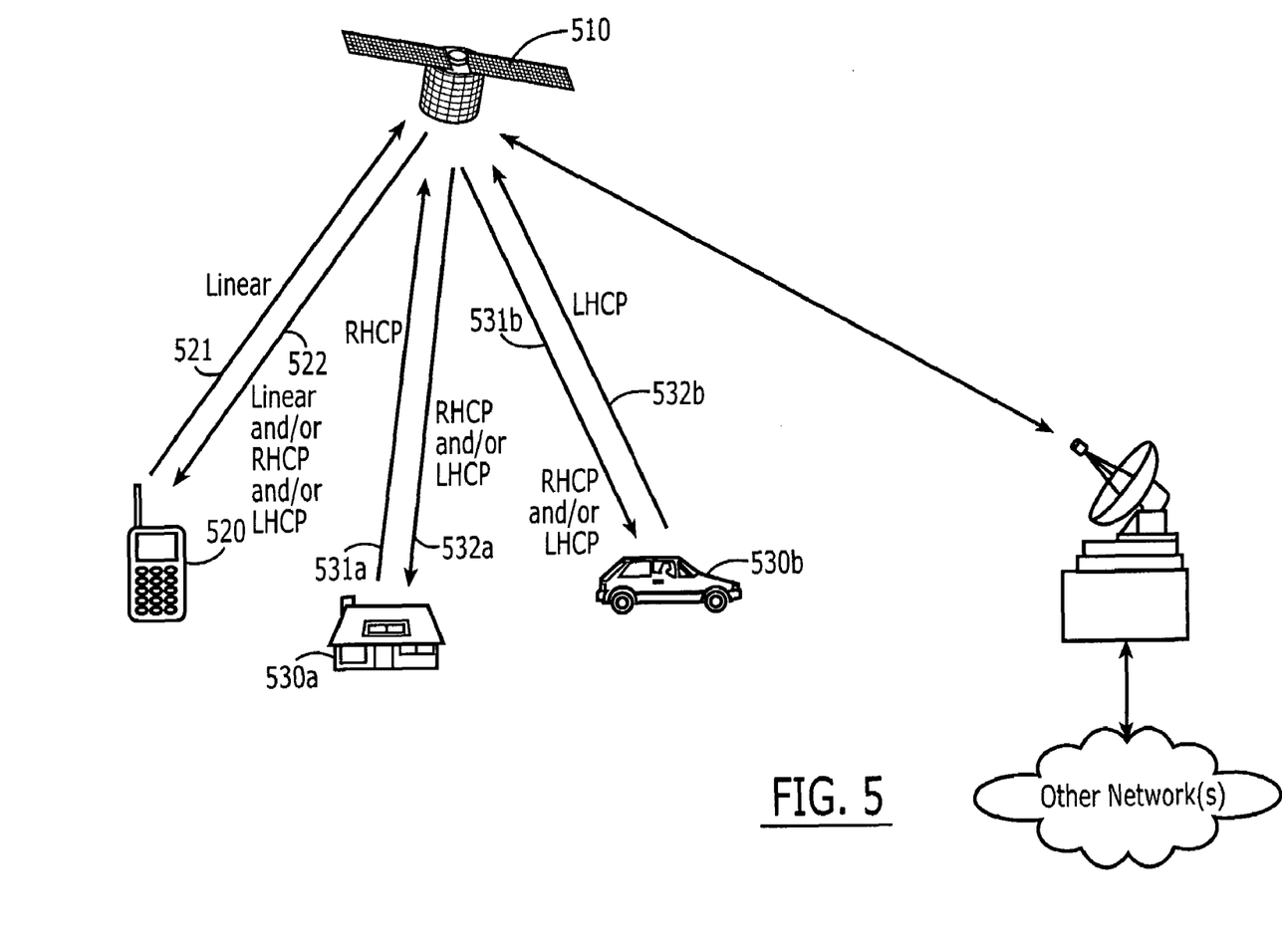
Figure 6:
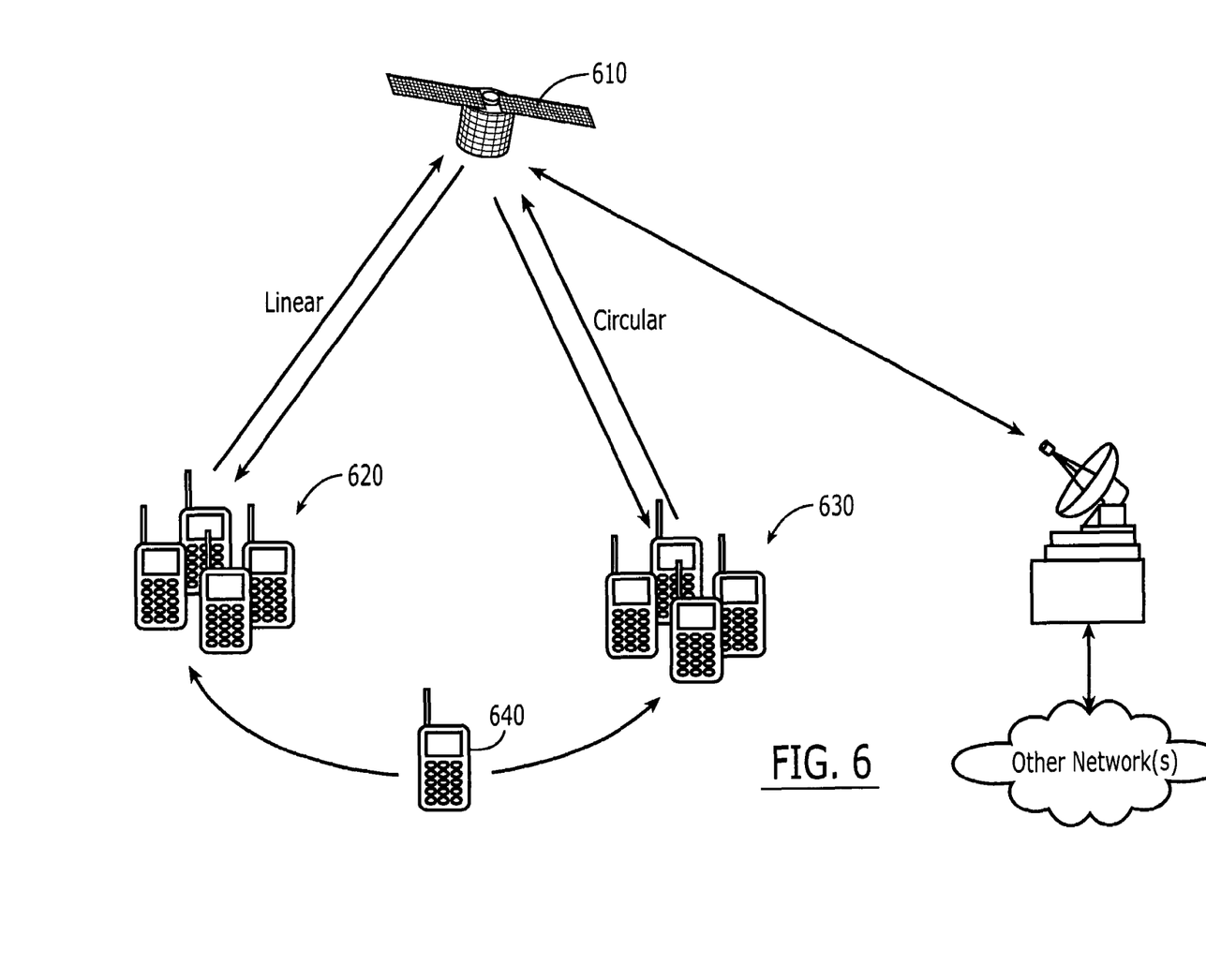

An example of polarization discrimination using linear and circular polarization for different classes or types of terminals along the lines discussed above is shown in FIG. 5. A satellite 510 is configured to receive substantially linearly polarized signals from a first class of radioterminals 520 over uplinks 521 and to receive substantially circularly polarized signals from a second class of terminals 530a, 530b over uplinks 531a and 532b, respectively. In receiving the substantially linearly polarized signals, the satellite 510 may be configured, in some embodiments, to receive substantially RHCP electromagnetic energy and substantially LHCP electromagnetic energy to thereby maximize a received signal power/energy given that a substantially linearly polarized electromagnetic signal comprises a RHCP component and a LHCP component. As shown, the second class of terminals includes a subclass 530a, here shown as including fixed terminals, that transmits to the satellite 510 using substantially RHCP, and a second subclass 530b, here shown as including vehicular terminals, that transmits to the satellite 510 using substantially LHCP. In the illustrated embodiments, the satellite 510 may transmit to the first class of terminals 520 over downlinks 522 using linear polarization, RHCP and/or LHCP. The satellite 510 may transmit to the second class of terminals 530a, 530b over downlinks 532a, 531b using RHCP and/or LCHP. It will be appreciated that, in other embodiments, other combinations of polarizations may be used. In still other embodiments of the present invention, multi-mode radioterminals may be provided that may be configured to transmit and/or receive using substantially linear polarization, substantially RHCP and/or substantially LHCP. The radioterminal may reconfigure itself based on a signal that may be provided by a network, for example, via a satellite, to allow service link/radioterminal reconfiguration. As shown in FIG. 6, for example, a satellite 610 may receive and/or transmit with linear polarization with a first set of terminals 620 and may receive and/or transmit with circular polarization with a second set of terminals 630. A multimode terminal 640 may be configurable, via manual intervention and/or responsive to a control channel command, to operate as one of the first group 610 or as one of the second group 630 depending on, for example, system loading, location of the terminal 640 and/or signal propagation/interference conditions.

An interference reducer may be configured at the satellite and/or at a satellite gateway to reduce a level of interference that may exist in a received signal of a radioterminal of one class due to a signal transmitted by a radioterminal of the same or other class. An interference reducer and/or monitor may be provided, for example, as was described in the above-cited U.S. Pat. No. 6, 684, 057 and/or published U.S. Patent Application Nos. US 2003/0054814 A1 or US 2003/0073436 A1.

In the specification, there have been disclosed embodiments of the invention and, although specific terms are employed, they are used in a generic and descriptive sense only and not for purposes of limitation. Many variations and modifications can be made to the embodiments described herein without substantially departing from the principles of the present invention. All such variations and modifications are intended to be included herein within the scope of the present invention, as set forth in the following claims.

What is claimed is:

1. A satellite communications method comprising:
assigning a first polarization to a first class of terminals based on membership in the first class;

assigning a second polarization to a second class of terminals based on membership in the second class, wherein the first and second polarizations are substantially different; and communicating between a satellite and the respective first and second classes of terminals using the substantially different first and second polarizations.

2. The method of claim 1, wherein communicating between a satellite and the respective first and second classes of terminals using the substantially different first and second polarizations comprises:

transmitting signals from the satellite to the first class of terminals with substantially the first polarization and/or transmitting from the first class of terminals to the satellite with substantially the first polarization; and transmitting signals from the satellite to the second-class of terminals with substantially the second polarization and/or transmitting from the second class of terminals to the satellite with substantially the second polarization.

3. The method of claim 1, wherein communicating between a satellite and the respective different first and second classes of terminals using the substantially different first and second polarizations comprises discriminating between signals having substantially the first polarization and signals having substantially the second polarization to discriminate between transmissions associated with the first class of terminals and transmissions associated with the second class of terminals.

4. The method of claim 1, wherein the first class of terminals comprises fixed and/or vehicle-based terminals, and wherein the second class of terminals comprises handheld terminals.

5. The method of claim 1, wherein the first class of terminals comprises terminals configured to preferentially receive and/or transmit linearly polarized signals, and wherein the second class of terminals comprises terminals configured to preferentially receive and/or transmit circularly polarized signals.

6. The method of claim 1, wherein the first class of terminals comprises terminals configured to preferentially receive and/or transmit right hand circularly polarized signals, and wherein the second class of terminals comprises terminals configured to preferentially receive and/or transmit left hand circularly polarized signals.

7. The method of claim 1, wherein communicating between a satellite and the respective first and second classes of terminals using the substantially different first and second polarizations comprises:

communicating between the satellite and the first class of terminals using a substantially circular polarization; and communicating between the satellite and the second class of terminals using a substantially linear polarization.

8. The method of claim 7, wherein communicating between the satellite and the first class of terminals using a substantially circular polarization comprises communicating between a space-based communications system and first and second subclasses of the first class of terminals using substantially different first and second substantially circular polarizations.

9. The method of claim 1, wherein communicating between a satellite and the respective first and second classes of terminals using the substantially different first and second polarizations comprises:

discriminating between signals having substantially a right hand circular polarization and signals having substantially a left hand circular polarization to discriminate between transmissions from the first class of terminals and transmissions from the second class of terminals; and transmitting from the satellite to the first and second classes of terminals using a substantially right-hand circular polarization and/or a substantially left-hand circular polarization.

10. The method of claim 1, wherein communicating between a satellite and the respective first and second classes of terminals using the substantially different first and second polarizations comprises:

discriminating between signals having substantially a right hand circular polarization and signals having substantially a left hand circular polarization to discriminate between transmissions from the first class of terminals and transmissions from the second class of terminals; and transmitting from the satellite to both of the first and second classes of terminals using a substantially right hand circular polarization or a substantially left hand circular polarization.

11. The method of claim 1, wherein communicating between a satellite and the respective first and second classes of terminals using the substantially different first and second polarizations comprises:

communicating between the satellite and the first class of terminals using a substantially linear polarization; and communicating between the satellite and the second class of terminals using a substantially circular polarization.

12. A satellite communications system comprising:

a satellite configured to communicate with respective first and second classes of terminals using substantially different polarizations such that the first class of terminals are assigned the first polarization based on membership in the first class and the second class of terminals are assigned the second polarization based on membership in the second class.

13. The system of claim 12, wherein the satellite is configured to transmit signals having substantially a first polarization to the first class of terminals and to transmit signals having substantially a second polarization to the second class of terminals.

14. The system of claim 12, wherein the satellite is configured to discriminate between signals having substantially a first polarization and signals having substantially a second polarization to discriminate between transmissions from the first class of terminals and transmissions from the second class of terminals.

15. The system of claim 12, wherein the first class of terminals comprises fixed and/or vehicle-based terminals, and wherein the second class of terminals comprises handheld terminals.

16. The system of claim 15, wherein the satellite is configured to communicate with the first class of terminals using a substantially circular polarization and to communicate with the second class of terminals using a substantially linear polarization.

17. The system of claim 16, wherein the satellite is configured to communicate with respective first and second subclasses of the first class of terminals using substantially different substantially circular polarizations.

18. The system of claim 12, wherein the satellite is configured to discriminate between signals having substantially a right hand circular polarization and signals having substantially a left hand circular polarization to discriminate between transmissions from the first class of terminals and transmissions from the second class of terminals, and wherein the satellite is further configured to transmit to the first and second classes of terminals using a substantially right hand circular polarization and/or a substantially left hand circular polarization.

19. The system of claim 12, wherein the satellite is configured to discriminate between signals having substantially a right hand circular polarization and signals having substantially a left hand circular polarization to discriminate between transmissions from the first class of terminals and transmissions from the second class of terminals, and wherein the satellite is further configured to transmit to both of the first and second classes of terminals using a substantially right hand circular polarization or a substantially left hand circular polarization.

20. The system of claim 12, wherein the satellite is configured to communicate with the first class of terminals using a substantially linear polarization and to communicate with the second class of terminals using a substantially circular polarization.

21. A wireless terminal configured to communicate with a satellite using substantially different polarizations in respective first and second modes of operation, wherein the terminal is configured to transmit signals having substantially a first polarization in the first mode and to transmit signals having substantially a second polarization in the second mode.

22. The terminal of claim 21, wherein the terminal is configured to preferentially receive signals having substantially the first polarization in the first mode and to preferentially receive signals having substantially the second polarization in the second mode.

23. The terminal of claim 21, wherein the terminal is configured to discriminate between signals having substantially the first polarization and signals having substantially the second polarization to discriminate between transmissions intended for the terminal and transmissions intended for another terminal.

24. A satellite configured to receive substantially linearly polarized signals from a first class of radioterminals and to receive substantially circularly polarized signals from a second class of radioterminals, wherein the satellite is further configured to receive a signal from a radioterminal of the first class of radioterminals by receiving a substantially RHCP component of the signal and a substantially LHCP component of the signal.

* * * * *